United States Patent
Hoffmann et al.

(10) Patent No.: US 6,256,479 B1
(45) Date of Patent: Jul. 3, 2001

(54) WIRELESS DOOR INTERCOM

(75) Inventors: Jean-Claude Hoffmann, Montanay; Serge Clauzel, Genay, both of (FR)

(73) Assignee: Comptoir Francais de l'Interphone, Trevoux (FR)

( * ) Notice: Subject to any disclaimer, the term of this patent is extended or adjusted under 35 U.S.C. 154(b) by 0 days.

(21) Appl. No.: 08/994,746

(22) Filed: Dec. 19, 1997

(51) Int. Cl.⁷ .................................................. H04B 1/44
(52) U.S. Cl. ................................................ 455/78; 455/410
(58) Field of Search ................. 379/102.06, 102.01; 455/78, 410

(56) References Cited

U.S. PATENT DOCUMENTS

| | | | |
|---|---|---|---|
| 3,710,136 | 1/1973 | Constable et al. | |
| 3,865,984 | * 2/1975 | Ewing | 179/2 |
| 3,978,468 | * 8/1976 | Bond et al. | 340/310 |
| 4,553,038 | 11/1985 | Fey . | |
| 4,764,953 | * 8/1988 | Chern et al. | 379/355 |
| 4,843,461 | * 6/1989 | Tatsumi | 385/108 |
| 5,032,820 | * 7/1991 | Tanikawa et al. | 340/310 |
| 5,303,300 | * 4/1994 | Ecksteia | 379/103 |
| 5,315,639 | 5/1994 | Lassers . | |
| 5,428,388 | * 6/1995 | Von Bauer et al. | 348/155 |
| 5,506,896 | * 4/1996 | Hoffman | 379/167 |
| 5,627,743 | * 5/1997 | Sadarnac | 363/124 |
| 5,657,380 | * 8/1997 | Mozer | 379/88 |
| 5,841,361 | * 11/1998 | Hoffman | 340/825.31 |
| 5,890,056 | * 3/1999 | Garner et al. | 455/67.1 |
| 5,905,787 | * 5/1999 | Stuart | 379/167 |

FOREIGN PATENT DOCUMENTS

| | | |
|---|---|---|
| C1 4408972 | 4/1995 | (DE) . |
| A2 0453957 | 10/1991 | (EP) . |
| A1 2593339 | 7/1987 | (FR) . |
| WO A 96-05688 | 2/1996 | (WO) . |

OTHER PUBLICATIONS

R. Besson, "Interphones et talkies–walkies," Editions Radio, Paris 1974.

* cited by examiner

*Primary Examiner*—Nguyen T. Vo
*Assistant Examiner*—N. Mehrpour
(74) *Attorney, Agent, or Firm*—Oliff & Berridge, PLC.

(57) ABSTRACT

A door intercom for a dwelling, the intercom comprising a street panel and an indoor set, the street panel being provided with a call button and being connected to an electric latch fitted to a door of the dwelling, the street panel including a radio transmitter and receiver, means for recognizing a latch-opening code received by the receiver, a stand-alone electrical power supply, and means for activating the electric circuit of the latch. The street panel also includes means for controlling electricity consumption firstly to put the street panel in a standby state in which its electricity consumption is practically zero while waiting for the call button to be pressed, and secondly to put it in an active state enabling a sound link to be established with the indoor set, and enabling the electric circuit of the latch to be activated when the latch-opening code is recognized, and the means for activating the electric circuit of the latch have the necessary amount of electrical energy available.

10 Claims, 2 Drawing Sheets

WIRELESS DOOR INTERCOM

The present invention relates to a door intercom for a dwelling, the intercom being of the type comprising a street panel designed to be used by a visitor and an indoor set designed to be used by an occupier of the dwelling, the street panel being provided with a call button and being connected to an electric latch fitted to a door of the dwelling, the street panel and the indoor set including means enabling a sound link to be established between them, and the indoor set including a button for causing the latch to open.

BACKGROUND OF THE INVENTION

Numerous door intercoms for dwellings of that type are known in which sound and data are conveyed between the street panel and the indoor set by one or more electric cables.

The electrical power consumed by the electric circuit of the latch is relatively large and it is typically greater than about 10 watts.

Manufacturers of electric latches therefore propose powering them from a transformer whose primary is connected to the mains supply, and whose secondary is capable of delivering about 20 watts of power.

Laying electric cables between the street panel and the indoor set and for powering the electric latch constitutes a problem when no provision was made therefor in the initial construction of the dwelling.

A similar problem is encountered when a cable needs to be laid between a call button and a doorbell located inside the dwelling. Devices, sometimes known as "wireless chimes", have been available for a long time, in which the traditional wire link between the call button and the doorbell is replaced by a radio link.

However, in a wireless chime the information transmitted by radio is one-way and very simple since all that is required is to trigger the doorbell under remote control, whereas with a door intercom information must travel in both directions, and the information concerned is more complex since it must not only enable dialog to be established between the visitor and the occupier, but it must also enable the latch to be remotely controlled when the occupier seeks to let the visitor in.

So far as the Applicant is aware, no wireless intercom has yet been made available.

Known techniques such as those implemented in wireless chimes provide no solution to the problem of electricity consumption by the street panel, and would require the use of batteries of large capacity and of high cost, or else battery replacement that is so frequent, or a number of batteries that is so large, as to remove any practical advantage in having a wireless link.

In addition, apart from the problem of street panel battery life, known wireless telephony techniques do not provide a solution to the problem of transmitting information such as a latch-opening command, since such transmission must be insensitive to interference in order to avoid any untimely opening of the latch which could jeopardize the security of the dwelling.

Finally, the wireless link between the street panel and the indoor set must be a long-range link in that it must work through the walls of the dwelling.

Unfortunately, the known solution of increasing the range of a transmitter by increasing its power is incompatible both with the requirement for battery lifetime in the street panel and with complying with transmission standards laid down by the authorities which put a severe limit on maximum authorized power.

French patent application No. FR-A-2 593 339 and German patent DE-C-44 08972 describe door intercoms in accordance with the precharacterizing portion of claim 1, and capable of controlling a latch by radio waves.

Nevertheless, in those known devices, the latch is not powered by an stand-alone power supply contained in the street panel and it is necessary to use a power supply cord to connect the latch or the street panel to the electricity mains supply, with all the drawbacks associated with installing such a cord unless installation thereof was planned at the time the dwelling was built.

OBJECTS AND SUMMARY OF THE INVENTION

An object of the invention is to propose a wireless door intercom for a dwelling in which the electricity consumption of the street panel is small enough to enable it to be powered by a small number of low cost batteries that do not require frequent replacement, and which also provides a sound link of good quality together with reliable control of latch opening.

The invention achieves this by the fact that the street panel further includes a radio transmitter and receiver and means for recognizing a latch-opening code received by said receiver, a stand-alone electrical power supply, means for activating the electric circuit of the latch, and means for controlling electricity consumption, firstly to put the street panel in a standby state where its electricity consumption is practically zero while waiting for the call button to be pressed, and secondly to put the panel in an active state enabling a sound link to be established with the indoor set, and enabling the electric circuit of the latch to be activated when the latch-opening code is recognized and the means for activating the electric circuit of the latch have the necessary amount of electrical energy.

In making the invention, the inventors have overcome the prejudice whereby the electricity consumption of a door intercom for a dwelling could not be decreased sufficiently to make it an attractive proposition to power it from a small number of low cost batteries, and that explains why no wireless door intercom for a dwelling has been available in the past in spite of the ever-present need for such a device and the large number of wireless telephones and chimes that have been available for a long time.

In a particular embodiment of the invention, the means for activating the electric circuit of the latch comprise a capacitor whose nominal capacitance is selected so that in the charged state, said capacitor is capable, on being discharged into the electric circuit of the latch, of activating it to enable the door to be opened.

Preferably, the latch-opening code recognition means are organized to trigger charging of said capacitor via a charging current limiter resistor when the latch-opening code has been recognized, and the means for activating the electric circuit of the latch comprise means for monitoring the potential on said capacitor and, when said potential exceeds a predetermined value, for causing it to discharge through the electric circuit of the latch.

Thus, because of the invention, the batteries constituting the stand-alone electrical power supply never deliver a current greater than a predetermined value, even when it is necessary to excite the latch, and the predetermined maximum current value can be selected to ensure long battery lifetime.

In a particular embodiment of the invention, the street panel includes means for causing a coded signal to be transmitted after a visitor has pressed the call button in order to cause a call signal to be issued by the indoor set, with the coded signal depending on the state of the stand-alone electrical power supply. The indoor set includes means for decoding said code signal and for issuing, when a predetermined code signal is recognized, a signal for informing the occupier that the stand-alone electrical power supply of the street panel is in a low state.

Thus, the occupier is informed that the batteries need replacing without any need to provide an indicator lamp on the street panel concerning the state of the batteries, which lamp would itself consume electricity and decrease the lifetime of the street panel batteries.

In a particular embodiment of the invention, said means for controlling the electricity consumption of the street panel include a timer triggered by depressing the call button, said timer causing the street panel to be maintained in the active state for a predetermined duration.

In a particular embodiment of the invention, the street panel includes a radio duplexer.

In a particular embodiment of the invention, the transmitter and the receiver of the street panel operate by frequency modulation (FM) and in duplex using two carriers at frequencies that are at least 10 MHz apart.

In a particular embodiment of the invention, the indoor set includes an answer button and a timer triggered by said button being pressed, said timer causing a radio transmitter to be powered electrically for a predetermined duration.

In a particular embodiment of the invention, the indoor set is powered by a battery that is rechargeable from the mains supply.

BRIEF DESCRIPTION OF THE DRAWINGS

Other characteristics and advantages of the present invention appear on reading the following detailed description of a non-limiting embodiment of the invention, and on examining the accompanying drawings, in which.

MORE DETAILED DESCRIPTION

Figure 1:
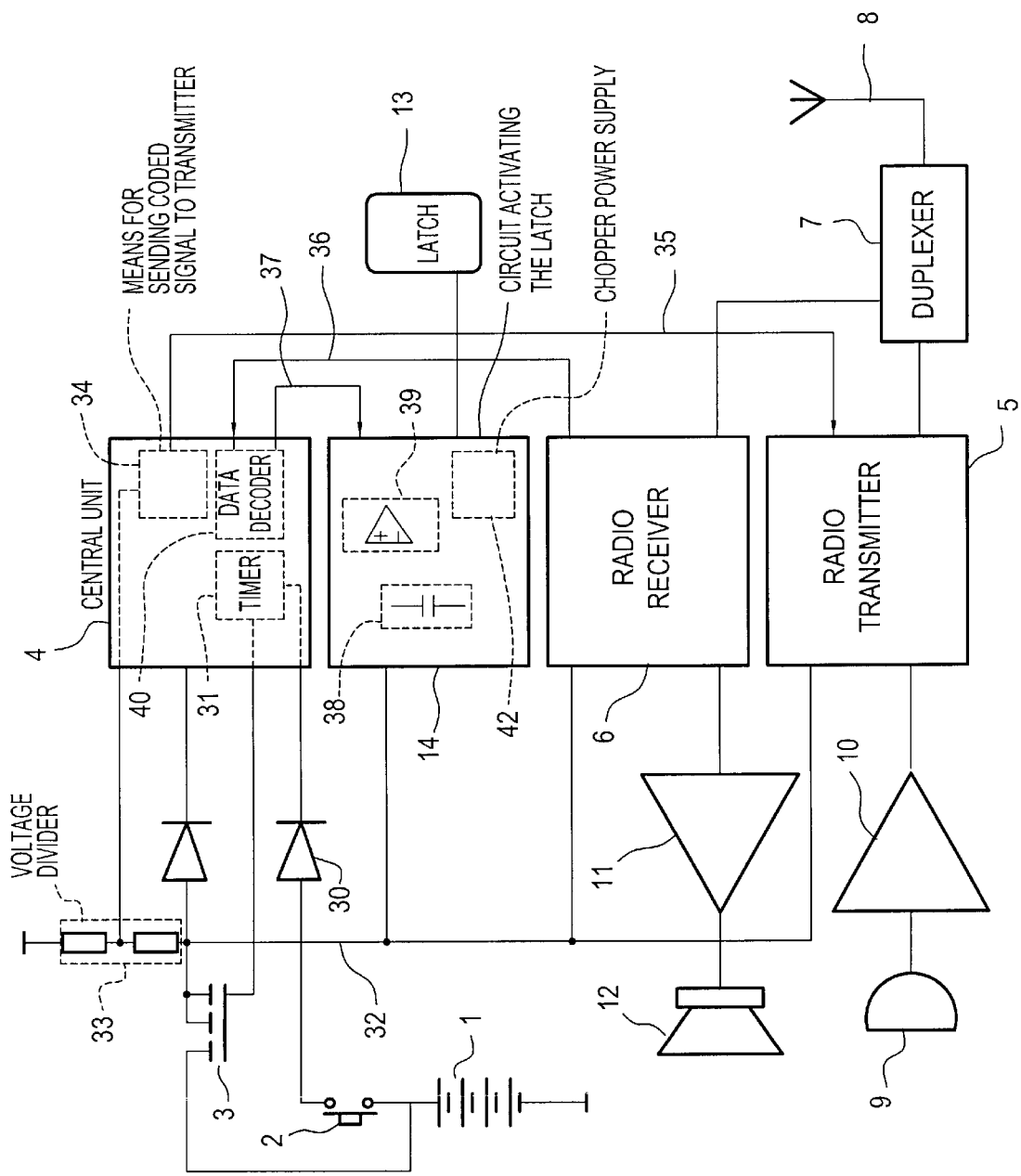
FIG. 1 is a block diagram of the street panel.

As shown in FIG. 1, the street panel comprises:

a stand-alone electrical power supply 1 constituted in the particular embodiment described by a series connection of four batteries of the commonly available LR 20 type (also known as "D" type);

a switch 2 acting as a call button;

an electronic switch 3;

a central unit 4;

a radio transmitter 5 type of the narrow band (±1.5 kHz) FM type having a transmission frequency lying in the 27 MHz band, for example, e.g. 26.995 MHz or 27.045 MHz or 27.145 MHz;

a radio receiver 6 of the narrow band (±1.5 kHz) FM type receiving at a frequency situated in the 40 MHz band for example, e.g. at 40.680 MHz;

a duplexer 7 connected firstly to the transmitter 5 and to the receiver 6, and secondly to a common antenna 8 which can be constituted, for example, by a simple length of strip coaxial cable;

a microphone 9 connected to a preamplifier 10 itself connected to the transmitter 5; and an amplifier 11 having its input connected to the receiver 6 and its output connected to a loudspeaker 12.

The transmitter frequency can be selected by using a special crystal or by using a component that allows a particular frequency to be selected under software control.

Software control has the advantage of enabling common hardware to operate at various different frequencies selected as a function of legislation in the country where the door intercom is to be used.

The street panel is connected to a latch 13 of the memory type, i.e. fitted with a conventional lever mechanism which remains in a state that allows the door to be opened once only after the electric circuit of the latch has received an electric control pulse, which pulse can be very short.

The street panel includes a circuit 14 for delivering a current pulse to the electric circuit of the latch 13.

In the standby state, electricity consumption of the street panel is less than 100 nA and can be considered as being practically zero.

The switch 2 constituting the call button is in the open state, as is the electronic switch 3.

The central unit 4, the circuit 14 for activating the latch 13, the transmitter 5, and the receiver 6 are not powered.

When a visitor arrives and presses the call button, an electric pulse is sent via a diode 30 to the central unit 4.

The central unit includes a timer 31 which is triggered by the pulse and which keeps the electronic switch 3 in the conductive state for a predetermined length of time, e.g. fixed at one minute.

The transmitter 5, the receiver 6, the circuit 14 for activating the latch 13, and the central unit 4 are then powered via the line 32.

The street panel includes a voltage divider 33, and the central unit 4 includes means 34 for sending a coded signal to the transmitter 5 as a function of the voltage delivered by the divider 33 in order to cause a call signal to be emitted from the indoor set.

The signal delivered by the means 34 to the transmitter is in digital form and it is encoded differently depending on whether the state of the electrical power supply 1 is satisfactory or whether it needs replacing.

Application of the coded signal to the transmitter 5 is represented by arrow 35 in FIG. 1.

After the coded signal has been sent, the receiver 6 is ready to receive a signal confirming that the occupier wishes to establish a sound link with the street panel.

The central unit 4 is also organized to cause a sound signal to be emitted by the loudspeaker 12 once the visitor has pressed on the call button 2, so as to confirm that the keypress has been effective.

The application of received data from the receiver 6 to the central unit 4 is represented by arrow 36 in FIG. 1.

The central unit 4 includes means 40 for decoding data received by the receiver 6, and if it includes a predetermined identity code, then the central unit 4 authorizes a sound link to be established in full duplex between the street panel and the indoor set.

Operation of the street panel is described in greater detail below.

Figure 2:
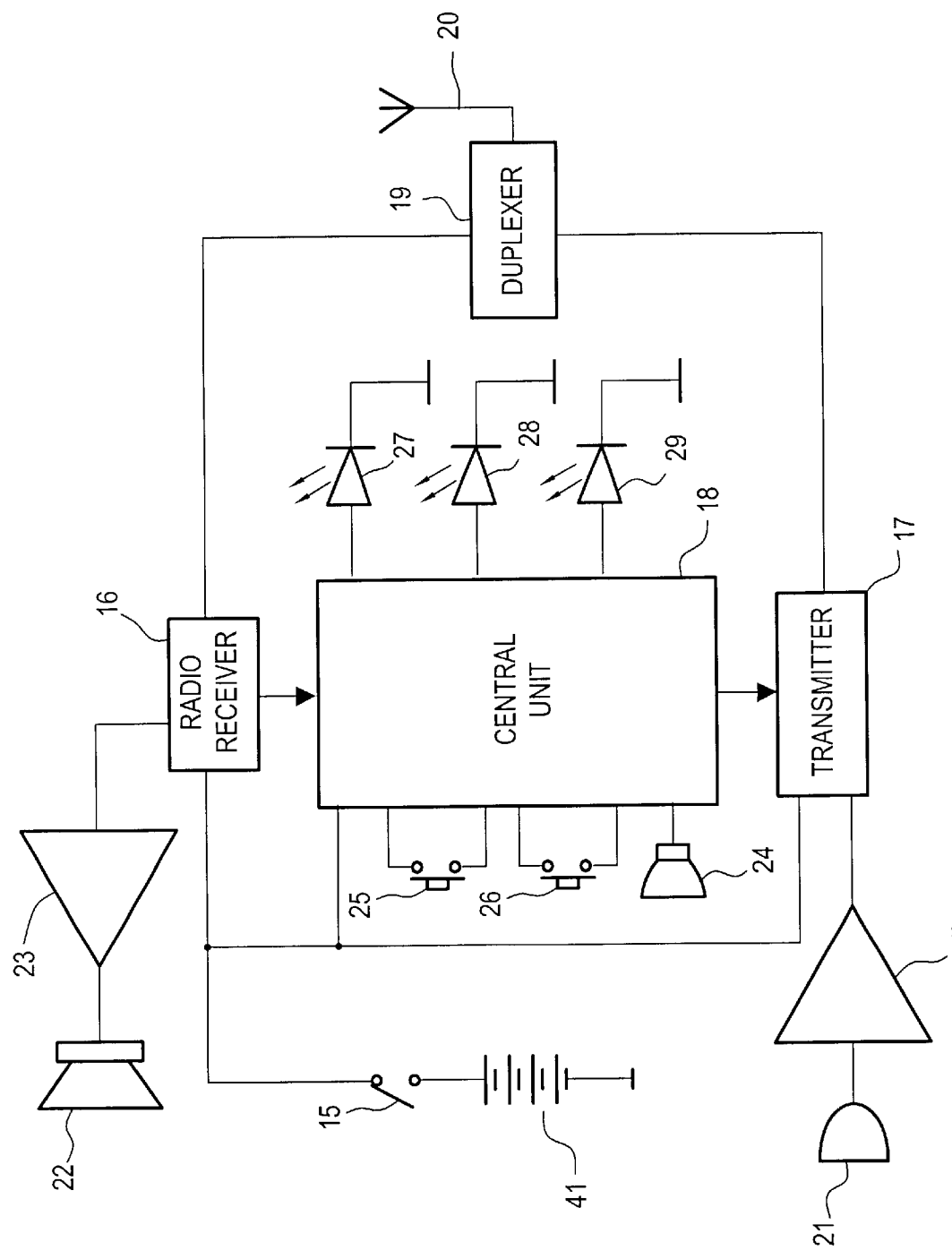
FIG. 2 is a block diagram of the indoor set.

As shown in FIG. 2, the indoor set comprises:

a stand-alone electrical power supply 41 constituted in the embodiment described by a rechargeable NiCd battery;

an on-off switch 15;

a radio receiver 16 of the FM type, that receives at a frequency which is tuned to the transmission frequency of the street panel transmitter 5;

a transmitter 17 of the FM type whose transmission frequency is tuned to the reception frequency of the street panel receiver 6;

a central unit 18;

a duplexer 19 connected both to the receiver 16 and to the transmitter 17, and also to a common antenna 20;

a microphone 21 connected to the input of a preamplifier 21' whose output is connected to the transmitter 17;

a loudspeaker 22 connected to the output of an amplifier 23 whose input is connected to the receiver 16;

a buzzer 24 connected to the central unit 18;

an answer button 25;

a button 26 for causing the latch 13 to open;

an indicator lamp 27 for warning the occupier that the electrical power supply 1 of the street panel needs to be replaced;

an indicator lamp 28 for informing the occupier that the state of charge of the rechargeable battery 41 is low; and an indicator lamp 29 for confirming to the occupier that the line has been answered.

In the particular embodiment described, the transmitter of the street panel or of the indoor set includes a crystal controlled local oscillator with an FM modulator fed with the signal coming from the microphone or the central unit, and a frequency tripler which makes it possible to obtain a frequency excursion that is compatible with a good signal-to-noise ratio in transmission. The output from the frequency tripler is applied to an amplifier stage having bipolar transistors which deliver the transmitter power required for proper operation of the link.

In the particular embodiment described, the receiver of the street panel or of the indoor set includes a specialized superheterodyne type circuit which performs first frequency conversion using a first crystal local oscillator followed by a second frequency change using a local oscillator that has a ceramic resonator.

The wireless door intercom operates as follows.

It is assumed that the street panel is in the standby state, with the electronic switch 3 being non-conductive.

The receiver 16 of the indoor set is permanently powered so as to be ready to receive any transmission of a call signal from the transmitter 5.

When a visitor presses the call button 2, the electronic switch 3 becomes conductive and the loudspeaker 12 issues a sound signal to inform the visitor that the keypress has worked.

The transmitter 5 is then powered and receives a coded signal from the central unit 4 representing the state of the batteries, which signal is transmitted to the indoor set.

The receiver 16 of the indoor set receives this signal and applies it to the central unit 18 which decodes it.

If the signal is interpreted as indicating that the batteries in the street panel need to be replaced, then the lamp 27 lights up.

Reception of the coded signal also causes the buzzer 24 to issue a sound signal to warn the occupier that the street panel has received a call.

The buzzer 24 may continue to issue a sound signal, e.g. for one minute, unless the occupier presses on the answer button 25.

When the occupier presses on the answer button 25, the central unit 18 switches off the buzzer 24 and turns on the lamp 29.

The lamp 28 lights up if the battery 41 needs to be recharged.

The central unit 18 applies a coded signal to the transmitter 17, which signal is received by the receiver 6 and as soon as it has been recognized by the central unit 4, the central unit controls operation of the transmitter 5 and of the receiver 6 so as to establish a full duplex sound link with the indoor set.

When the occupier presses on the button 26 for opening the latch, the indoor set transmits a coded latch-opening signal in digital form which is received by the receiver 6 and applied to the central unit 4 in order to be decoded.

By way of example, the code may use 10 bits.

If the latch-opening signal is recognized, then, as represented by arrow 37 in FIG. 1, the central unit applies a signal to the circuit 14 to cause it to excite the electric circuit of the latch.

A capacitor 38 begins to be charged as soon as the control signal 37 is received. In the example described, the circuit 14 includes a chopper power supply 42 for charging the capacitor to a voltage greater than that of the power supply 1, e.g. to 12 V.

The comparator 39 compares the voltage on the capacitor 38 with a predetermined value that is selected in such a manner that the electrical energy stored in the capacitor, once its potential has reached said predetermined value, is sufficient for discharging the capacitor into the electric circuit of the latch to enable the door to be opened. By way of example, the nominal capacitance of the capacitor is 2200 $\mu$F or 4700 $\mu$F, and it is charged through a charging current limiting resistor, e.g. having a resistance of 10 ohms.

After the latch 13 has been excited (or in a variant after a predetermined duration after the latch 13 has been excited, or indeed in another variant after a predetermined duration following depression of the call button 2), the electronic switch 3 opens and the street panel returns to the standby state in which its consumption of electricity is practically zero.

Naturally, the invention is not limited to the embodiment described above.

In particular, it is possible to power the indoor set permanently from the mains supply, however it is nevertheless advantageous for its power supply to be provided by means of a rechargeable battery 41 since that enables the indoor set to be implemented in the form of a portable handset similar in format to the handset of a cordless telephone.

The central unit 4 may be constituted, for example, by a microcontroller programmed to perform, in particular, the functions of the above-described means 31, 34, and 40.

In a variant, these functions may be implemented by a set of discrete electronic components, or by an application specific integrated circuit (ASIC).

The duplexers 7 and 19 may be specialized components designed to operate at predetermined frequencies, or they may be implemented by assembling passive components such as ferrite pots, inductors, and ceramic filters in order to make it possible to fit the same duplexer to a plurality of door intercoms operating at significantly different frequencies, with tuning being performed for each frequency by adjusting one or more of the components of the duplexer.

The term "dwelling" should be understood to cover not only a single-family dwelling, but also a group of dwellings, an apartment block, or indeed premises for professional use.

What is claimed is:

1. A door intercom for a dwelling, the intercom being of the type comprising a street panel designed to be used by a visitor and an indoor set designed to be used by an occupier of the dwelling, the street panel being provided with a call button and being connected to an electric latch fitted to a door of the dwelling, the street panel and the indoor set including means enabling a sound link to be established between them, and the indoor set including a button for causing the electric latch to open, the street panel including a radio transmitter and receiver, and means for recognizing a latch-opening code received by said receiver, wherein the street panel further includes a stand-alone electrical power supply having a voltage, means for activating the electric circuit of the latch, and means for controlling electricity consumption firstly to put the street panel in a standby state where its electricity consumption is practically zero while waiting for the call button to be pressed, and secondly to put the panel in an active state enabling a sound link to be established with the indoor set, and enabling the electric circuit of the latch to be activated when the latch-opening code is recognized and the means for activating the electric circuit of the latch have the necessary amount of electrical energy, said means for activating the electric circuit of the latch comprising a capacitor whose nominal capacitance is selected so that in a charged state, said capacitor is capable on being discharged into the electric circuit of the latch, of activating the latch to enable a door to be opened, wherein said capacitor is charged under a voltage that is greater than the voltage of the stand-alone electrical power supply, wherein the charging of said capacitor occurs once the latch-opening code has been recognized.

2. A door intercom according to claim 1, wherein the means for activating the electric circuit of the latch comprise means for monitoring the potential on said capacitor and, when said potential reaches a predetermined value, for causing it to discharge through the electric circuit of the latch.

3. A door intercom according to claim 1, wherein the street panel includes means for causing a coded signal to be transmitted after a visitor has pressed the call button in order to cause a call signal to be issued by the indoor set, the coded signal depending on the state of the stand-alone electrical power supply, and wherein the indoor set includes means for decoding said code signal and for issuing, when a predetermined code signal is recognized, a signal for informing the occupier that the stand-alone electrical power supply of the street panel is in a low state.

4. A door intercom according to claim 1, wherein said means for controlling the electricity consumption of the street panel include a timer triggered by depressing the call button, said timer causing the street panel to be maintained in the active state for a predetermined duration.

5. A door intercom according to claim 1, wherein the street panel includes a radio duplexer.

6. A door intercom according to claim 1, wherein the transmitter and the receiver of the street panel operate by FM and in duplex using two carriers at frequencies that are at least 10 MHz apart.

7. A door intercom according to claim 1, wherein the indoor set includes an answer button and a timer triggered by said button being pressed, said timer causing a radio transmitter to be powered electrically for a predetermined duration.

8. An intercom according to claim 1, wherein the indoor set is powered by a battery that is rechargeable from the mains supply.

9. An intercom according to claim 1, wherein the means for activating the electric circuit of the latch include a chopper power supply for charging the capacitor to a voltage higher than that of the stand-alone electrical power supply.

10. A door intercom for a dwelling, the intercom being of the type comprising a street panel designed to be used by a visitor and an indoor set designed to be used by an occupier of the dwelling, the street panel being provided with a call button and being connected to an electric latch fitted to a door of the dwelling, the street panel and the indoor set including means enabling a sound link to be established between them, and the indoor set including a button for causing the electric latch to open, the street panel including a radio transmitter and receiver, and means for recognizing a latch-opening code received by said receiver, wherein the street panel further includes a stand-alone electrical power supply having a voltage of 6 volts, said stand-alone electrical power supply being constituted of four batteries in series, the indoor set being implemented in the form of a portable handset including a lamp for warning the occupier that the stand-alone electrical power supply of the street panel has to be replaced, a button for causing the latch to open and an answer button, means for activating the electric circuit of the latch comprising means for monitoring the potential on said capacitor and, when said potential reaches a predetermined value, for causing it to discharge through the electric circuit of the latch, and means for controlling electricity consumption firstly to put the street panel in a standby state where its electricity consumption is practically zero while waiting for the call button to be pressed, and secondly to put the panel in an active state enabling a sound link to be established with the indoor set, and enabling the electric circuit of the latch to be activated when the latch-opening code is recognized and the means for activating the electric circuit of the latch have the necessary amount of electrical energy, said means for activating the electric circuit of the latch comprising a capacitor whose nominal capacitance is selected so that in a charged state, said capacitor is capable, on being discharged into the electric circuit of the latch, of activating the latch to enable a door to be opened, wherein said capacitor is charged under a voltage that is greater than the voltage of the stand-alone electrical power supply, wherein the charging of said capacitor occurs once the latch-opening code has been recognized.

* * * * *